US010883009B2

(12) United States Patent
Anton et al.

(10) Patent No.: US 10,883,009 B2
(45) Date of Patent: Jan. 5, 2021

(54) AQUEOUS INK-JET INK CONTAINING LOW BOILING POINT COMPOSITIONS

(71) Applicant: E I DU PONT DE NEMOURS AND COMPANY, Wilmington, DE (US)

(72) Inventors: Waifong Liew Anton, Wilmington, DE (US); Xiaoqing Li, Newark, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 0 days.

(21) Appl. No.: 15/769,187

(22) PCT Filed: Nov. 2, 2016

(86) PCT No.: PCT/US2016/060103
§ 371 (c)(1),
(2) Date: Apr. 18, 2018

(87) PCT Pub. No.: WO2017/079288
PCT Pub. Date: May 11, 2017

(65) Prior Publication Data
US 2018/0320010 A1 Nov. 8, 2018

Related U.S. Application Data

(60) Provisional application No. 62/249,505, filed on Nov. 2, 2015.

(51) Int. Cl.
C09D 11/00 (2014.01)
C09D 11/38 (2014.01)
C09D 11/322 (2014.01)
C09D 11/30 (2014.01)
C09D 11/326 (2014.01)
C09D 11/033 (2014.01)
C09D 11/037 (2014.01)
C09D 11/102 (2014.01)
C09D 11/107 (2014.01)

(52) U.S. Cl.
CPC .............. *C09D 11/38* (2013.01); *C09D 11/00* (2013.01); *C09D 11/033* (2013.01); *C09D 11/037* (2013.01); *C09D 11/102* (2013.01); *C09D 11/107* (2013.01); *C09D 11/30* (2013.01); *C09D 11/322* (2013.01); *C09D 11/326* (2013.01)

(58) Field of Classification Search
CPC ....... C09D 11/00; C09D 11/38; C09D 11/003; C09D 11/037; C09D 11/107; C09D 11/30; C09D 11/322; C09D 11/326; C09D 11/102; C09D 11/033
USPC ........................................................ 523/160
See application file for complete search history.

(56) References Cited

U.S. PATENT DOCUMENTS

| | | | |
|---|---|---|---|
| 4,597,794 A | 7/1986 | Ohta et al. | |
| 5,085,698 A | 2/1992 | Ma et al. | |
| 5,231,131 A | 7/1993 | Chu et al. | |
| 5,554,739 A | 9/1996 | Belmont | |
| 6,117,921 A | 9/2000 | Ma et al. | |
| 6,262,152 B1 | 7/2001 | Fryd et al. | |
| 6,306,994 B1 | 10/2001 | Donald et al. | |
| 6,433,117 B1 | 8/2002 | Ma et al. | |
| 6,852,156 B2 | 2/2005 | Yeh et al. | |
| 9,249,324 B2 * | 2/2016 | Li | C09D 11/326 |
| 9,249,325 B2 * | 2/2016 | Anton | C09D 11/322 |
| 10,087,336 B2 * | 10/2018 | Li | C09D 11/102 |
| 2005/0215663 A1 | 9/2005 | Berge et al. | |
| 2009/0258196 A1 * | 10/2009 | Nagashima | B41M 5/0023 428/195.1 |
| 2012/0050380 A1 * | 3/2012 | Falkner | C09D 11/102 347/20 |
| 2012/0214939 A1 | 8/2012 | Li et al. | |
| 2013/0253130 A1 | 9/2013 | Berge | |

FOREIGN PATENT DOCUMENTS

| | | |
|---|---|---|
| EP | 0556649 A1 | 8/1993 |
| EP | 2274385 A1 | 1/2011 |
| WO | 2009/143233 A1 | 11/2009 |
| WO | 2015/102868 A1 | 7/2015 |

OTHER PUBLICATIONS

Society of Dyers and Colourists, Bradford, Yorkshire, UK and published in the Color Index, Third Edition, 1971.
PCT International Search Report for Application No. PCT/US2016/060103; Feldmann, Gabriele, Authorized Officer, ISA/EPO; dated Jan. 12, 2017.

* cited by examiner

Primary Examiner — Hannah J Pak
(74) Attorney, Agent, or Firm — Simon L. Xu

(57) ABSTRACT

An aqueous ink-jet ink which contains an aqueous vehicle, a dispersed binder, and one or more nonionic surfactants. The aqueous vehicle contains solvents with boiling points less than 200° C., or solvents with boiling points greater than 200° C. and having a solubility of water in solvents of less than 50% by weight. The ink is particularly advantageous for printing on coated offset media with.

15 Claims, No Drawings

AQUEOUS INK-JET INK CONTAINING LOW BOILING POINT COMPOSITIONS

BACKGROUND OF THE DISCLOSURE

This disclosure relates to novel aqueous ink-jet inks containing an aqueous vehicle, a dispersed binder, and one or more nonionic surfactants. The aqueous vehicle contains solvents with boiling points less than 200° C. or solvents with boiling points greater than 200° C. and having a solubility of water in solvents of less than 50% by weight.

Ink-jet digital printing method is becoming increasingly important. It offers a number of potential benefits over conventional printing methods such as screen printing. Digital printing eliminates the set-up expense associated with screen preparation and can potentially enable cost-effective short run production. Digital printing furthermore allows visual effects, such as tonal gradients and repeat of printed patterns that cannot be practically achieved with a screen printing process. Especially beneficial is the ease in changing the patterns of originals during production of digital printing, when it is possible to respond to a change in patterns or other requirements within a short period of time.

Fast speed printing includes roll-to-roll printing and cut-sheet printing. In the former, the printed image is rolled up into rolls soon after passing through drying elements, and in the latter printed sheets are stacked up on top of each other cause the printed image to be subjected to pressure for possibly an extended period of time soon after drying. Both scenarios require the printed image to dry rapidly. The need for fast drying is more significant during duplex printing where one side of a printed image is pressed against another printed side. Even greater care has to be taken in the selection of solvents to avoid printed images from sticking to each other and be damaged when these sheets are peeled apart after some time in close contact.

Fast printing of aqueous inks on coated offset media faces an acute problem of slow drying which is a result of the rate of dissipation of the co-solvents and water. Until sufficient removal of co-solvents and water had occurred, the printed images remain soft and therefore not durable. Liquid loss is dependent on a combination of evaporation into the atmosphere and on absorption into the media. However, because the porosity of these offset media is low, the liquid loss is retarded leading to slower onset of durability of the image. This slower onset of durability can negatively limit the speed of production.

It is possible to improve drying mechanically through applying more heat and/or stronger blowers to facilitate removal of liquid. Applying more heat can, of course, increases cost which is unfavorable. Furthermore, since printed images often have varying degree of ink coverage over the substrate, sufficient heating to dry the wettest areas may damage the substrates where less/no inks was applied and cause over-drying in those areas. Stronger airflow helps drying but too high of a blowing rate can also cause defects to the images by disturbing the wet ink.

A need exists for ink-jet inks with superior drying properties that can be printed on low permeability substrates to form durable, high quality image. The present disclosure satisfies this need by providing inks containing particular combinations of binders, surfactants and solvents that afford superior drying and durable images.

SUMMARY OF THE DISCLOSURE

An embodiment of the present disclosure provides an aqueous inkjet ink for printing on coated media, said ink comprising a dispersed pigment, an aqueous vehicle, a dispersed polymeric binder, and one or more nonionic surfactants, wherein said aqueous vehicle comprises one or more members of Group A solvents and one or more members of Group B solvents, wherein said Group A solvents contain two or more hydroxyl moieties per solvent molecule, and said Group B solvents contain one hydroxyl moiety per solvent molecule.

Another embodiment provides that the boiling points of said Group A solvents are less than 200° C.

Another embodiment provides that the boiling points of said Group B solvents are less than 200° C.

Another embodiment provides that the boiling point of said Group B solvents are higher than 200° C. and the solubility of water in said Group B solvents is less than 50% by weight.

Another embodiment provides that the ratio of said Group A solvents to said Group B solvents is in the range of 10:1 to 0.75:1.

Another embodiment provides that the ratio of said Group A solvents to said Group B solvents is in the range of 5:1 to 1:1.

Another embodiment provides that the ratio of said Group A solvents to said Group B solvents is in the range of 4:1 to 1.2:1.

Another embodiment provides that the total of Group A solvents and Group B solvents is about 75% by weight of the sum of all solvents in said ink.

Another embodiment provides that the total of Group A solvents and Group B solvents is about 85% by weight of the sum of all solvents in said ink.

Another embodiment provides that the total of Group A solvents and Group B solvents is about 95% by weight of the sum of all solvents in said ink.

Another embodiment provides that the total of all solvents other than water is less than about 45% by weight based on the total weight of said ink.

Another embodiment provides that the total of all solvents other than water is less than about 35% by weight based on the total weight of said ink.

Another embodiment provides that the total of all solvents other than water is less than about 30% by weight based on the total weight of said ink.

Another embodiment provides that the Group A solvents are selected from the group consisting of methyl pentane diol, ethylene glycol and propane diol.

Another embodiment provides that the Group B solvents are selected from the group consisting of propylene glycol methyl ether, propylene glycol di-methyl ether, propylene glycol n-propyl ether, propylene glycol n-butyl ether, dipropylene glycol methyl ether, dipropylene glycol n-propyl ether, dipropylene glycol n-butyl ether, tripropylene glycol n-propyl ether, tripropylene glycol n-butyl ether, propylene glycol methyl ether acetate and dipropylene glycol methyl ether acetate, Another embodiment provides that the one or more non-ionic surfactants include a non-ionic fluoro surfactant.

Another embodiment provides that the polymeric binder is a dispersed polyurethane or a mixture of a dispersed polyurethane and a dispersed olefin ionic copolymer.

Another embodiment provides that the polyurethane has a hard segment and a soft segment, and the percentage of soft segment is less than 72%.

Yet another embodiment provides that the percentage of soft segment is in the range of 50% to 70%.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "AN" means acid number, mg KOH/gram of solid polymer.

As used herein, the term "DBTDL" means dibutyltin dilaurate.

As used herein, the term "DMPA" means dimethylol propionic acid.

As used herein, the term "TMDI" means trimethylhexamethylene diisocyanate.

As used herein, the term "IPDI" means isophorone diisocyanate.

As used herein, the term "Sulfolane" means tetramethylene sulfone.

As used herein, Surfynol® 104 is a surfactant manufactured by Air Products, Allentown, Pa.

As used herein, the term "TRB-2" means Dainichiseika® TRB-2, a cyan pigment.

As used herein, the term "HLB" means hydrophilic-lipophilic balance.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Pigments

The term "pigment" as used herein means an insoluble colorant that requires to be dispersed with a dispersant and processed under dispersive conditions in the presence of a dispersant. The dispersion process results in a stable dispersed pigment.

The selected pigment(s) may be used in dry or wet form. For example, pigments are usually manufactured in aqueous media, and the resulting pigments are obtained as a water-wet presscake. In presscake form, the pigment does not agglomerate to the extent it would in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as TiO2 and ZnO; and black pigment carbon black. The pigment names and abbreviations used herein are the "C.I." designation for pigments established by Society of Dyers and Colourists, Bradford, Yorkshire, UK and published in The Color Index, Third Edition, 1971.

The pigment of the present disclosure can also be a self-dispersing (or self-dispersible) pigment. The term self-dispersing pigment (or "SDP") refers to pigment particles whose surface has been chemically modified with hydrophilic, dispersability-imparting groups that allow the pigment to be stably dispersed in an aqueous vehicle without a separate dispersant. "Stably dispersed" means that the pigment is finely divided, uniformly distributed and resistant to particle growth and flocculation.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in inkjet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP.

The SDPs of the present disclosure may have a degree of functionalization wherein the density of anionic groups is less than about 3.5 µmoles per square meter of pigment surface (3.5 µmol/m2), and more specifically, less than about 3.0 µmol/m2. Degrees of functionalization of less than about 1.8 µmol/m2, and more specifically, less than about 1.5 µmol/m2, are also suitable and may be preferred for certain specific types of SDPs.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Polymeric Dispersant

The polymeric dispersant for the non-self-dispersing pigment(s) may be a random or a structured polymer. Typically, the polymer dispersant is a copolymer of hydrophobic and hydrophilic monomers. The "random polymer" means polymers where molecules of each monomer are randomly arranged in the polymer backbone. For a reference on suitable random polymeric dispersants, see: U.S. Pat. No. 4,597,794. The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. Nos. 6,117,921, 6,262,152, 6,306,994 and 6,433,117.

Polyurethane Dispersants

Suitable dispersants for the instant disclosure include polyurethanes, particularly cross-linked polyurethanes, such as the ones disclosed in U.S. Patent Application Publication No. 2012/0214939, which is incorporated by reference herein as if fully set forth.

Polymeric Binder

Suitable polymeric binders for the instant disclosure include dispersed polyurethane or a mixture of a dispersed polyurethane and a dispersed olefin ionic copolymer. The polyurethane binders are discussed in U.S. Patent Application Publication No. 2005/0215663, which is incorporated by reference herein as if fully set forth.

The dispersed polyurethane binders contain soft and hard segments which are readily understood by one of ordinary skill of art. Typically, the polyurethane binders contain less than 72% of soft segments by weight. More typically, the polyurethane binders contain between 50% and 70% of soft segments by weight. Soft segments are usually built into the polyurethane chain from long chain molecules with isocyanate reactive functional groups, such as hydroxyl, amine, and thiol functionality. Typical soft segments are polymeric polyols with molecular weight range from about 100 to about 6000, typically from about 200 to about 3000, and more typically from about 400 to about 2500. The molecular weights are determined by hydroxyl group analysis (OH number). Examples of polyols include polycarbonate diols, polyester diols, polyester-carbonate diol, and polyether diols. Polycarbonate diol, especially cyclic diol derived polycarbonate diol and polyester-carbonate diols are preferred.

The dispersed olefin ionic copolymers of the present disclosure include, but not limited to, copolymers of ethylene and acrylic acid, ethylene and methacrylic acid, propylene and acrylic acid, propylene and methacrylic acid, and the respective terpolymers and mixture thereof.

The dispersed polyurethane and dispersed olefin ionic copolymer are included in the ink in an effective amount to improve short term print durability relative to the same ink without these additives. Typically, these additives are present in an ink at a level of at least about 0.2% by weight based on the total weight of the ink. The upper level is not limited, but is dictated by considerations such as compatibility with other ink components. The weight ratio of the dispersed polyurethane polymer and the dispersed olefin ionic copolymer is typically from 0.1:1.0 to 1.0:0.1, and more typically from 0.5:1.0 to 1.0:0.5.

Typically the binder is different from the polyurethane dispersant described above in the Polymeric Dispersant section, and is non-reactive to the colorant. The binder is typically added to an ink during the final formulation stage, not during the preparation of a pigment dispersion.

Group A and Group B Solvents

The Group A solvents of the present disclosure contain two or more hydroxyl moieties per solvent molecules with boiling points below about 200° C. The Group B solvents contain one or no hydroxyl moiety per solvent molecule with boiling points below about 200° C. The Group B solvent can also have boiling points above about 200° C., in which case the solubility of water in such Group B solvents is less than 50 parts water in 100 parts of said solvents. One of ordinary skill in the art can select suitable Group A and Group B solvents based on the disclosure herein. Typical solvents in Group A include methyl pentane diol, ethylene glycol and propane diol. Typical solvents in Group B include propylene glycol methyl ether, propylene glycol di-methyl ether, propylene glycol n-propyl ether, propylene glycol n-butyl ether, dipropylene glycol methyl ether, dipropylene glycol n-propyl ether, dipropylene glycol n-butyl ether, tripropylene glycol n-propyl ether, tripropylene glycol n-butyl ether, propylene glycol methyl ether acetate and dipropylene glycol methyl ether acetate.

The ratio of Group A solvents to Group B solvent is typically from 10:1 to 0.75:1, more typically from 5:1 to 1:1, and most typically from 4:1 to 1.2:1.

The sum of Group A solvents and Group B solvent is at least about 75% of the total solvents in the ink by weight excluding water, pigments, dispersant polymers, binder polymers, surfactants, biocides, and buffers. Typically, this sum is at least 85% of the total solvents in the ink by weight, more typically at least 90% of the total solvents in the ink by weight, and most typically at least 95% of the total of solvents in the ink by weight.

The sum of all solvents excluding water, surfactants, biocides and buffers is typically less than 45% by weight based on the total weight of the ink, more typically less than 35% by weight based on the total weight of the ink, and most typically less than 30% by weight based on the total weight of the ink.

The final ink composition containing Group A and Group B solvents has no detectable flashpoint by closed cup measurements, to at least 60° C., more typically to at least 67° C., and most typically to at least 94° C.

Surfactants

The inks of the present disclosure contain one or more non-ionic surfactants. The presence of surfactants improves blocking. Blocking is a measure of durability towards damage when printed sheets are either stacked, or when wound up into rolls. Under these conditions the printed images are under pressure. In poor blocking performance, color could be transferred from the printed image onto another sheet of media, that second sheet is either unprinted or itself also printed. The degree of color contamination of the second sheet is a measure of blocking. In more severe incidences of blocking, parts of the original printed image are also lifted off during the transfer leaving behind areas of diminished coloration. The faster an ink dries, the faster the ink achieves improved blocking.

Non-ionic fluoro-surfactants were found to be favorable for blocking when used in conjunction with the combination of Group A and Group B solvents described above. Other suitable nonionic surfactants include hydrocarbon surfactants, typically the ones having a HLB value of 4 or below, and acetylenic diols surfactants, such as Surfynol surfactants from Air Products. These surfactants provide reduction in surface tension affording good wetting of ink on print media while at the same time have low tendency towards foaming in inks.

Non-ionic silicone surfactants also work well for blocking and wetting of ink on media. However, larger amount of silicone surfactants is needed in order to ensure the level of desired surface activity over longer storage time. Under certain storage conditions, the surface tension of the inks containing lower levels of silicone surfactants may increase over time, and is thus undesirable.

Combination of Surfactant, Group A Solvents, Group B Solvents, and Polymeric Binder The rate of drying of aqueous inks on coated media impact many print properties, among them is blocking. An ink must be formulated to spread on a media so as to maximize the surface area for maximum rate of evaporation and/or adsorption into the media. Spreading can be achieved by addition of sufficient amounts of wetting agents including solvents and surfactants.

Another approach to better blocking is to include in an ink with none or only low amounts of polymeric binders (about 1% or less). The reason that the presence of binder retards drying is not entirely clear. Perhaps the binders form a layer on or near the surface which can trap or slow down the release of liquids. Or perhaps binders have an affinity to the liquids thus holding on to the liquids and slowing down their releases. However, an ink without or with only low level of binders may result in a dried ink film that does not have sufficient durability towards certain mechanical stresses such as scratching, rubbing of the printed image.

Addition of solvents to aqueous inks containing binders often aggravates blocking problems and requires more drying time to achieve full durability. Perhaps the solvents plasticize the binders, soften the film and thus render it less durable. Or perhaps the solvents, many of them are humectants, slow down the release of water resulting in longer drying time of the printed ink film.

Thus inks containing both binders and solvents suffer from poor blocking. However, both binders and solvents are necessary for an ink jet inks to achieve critical properties such as durability, image quality and good jetting. While it may be an option not to include binders in an ink at the expense of durability, it is not an option to exclude solvents in ink jet inks because they are necessary for the basic jetting performance of the inks. The Group A solvents and Group B solvents of the present disclosure were surprisingly found to accommodate the presence of polymeric binders in an ink resulting in the ink meeting all critical to quality requirements.

Ink Vehicle

The pigmented ink of this disclosure comprises an ink vehicle typically an aqueous ink vehicle, also known as an aqueous carrier medium or aqueous vehicle.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

The aqueous vehicle of the present disclosure includes Group A solvents and Group B solvents described above.

Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device where it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s The ink of the present disclosure can be printed on a variety of substrates. It is particularly advantageous for coated media. Coated media is generally known to have poor receptivity to aqueous ink jet inks and are commonly referred to as offset papers, coated laser papers, or even as digital papers which refer to toner-based digital printing. These papers have low surface porosity due to calendaring and/or application of one or more layers of hydrophobic coating layers. Such surface smoothing procedures and coatings provide papers that can withstand the high tack of traditional printing paste and/or be receptive to hydrophobic toner particles.

The following examples illustrate the invention without, however, being limited thereto.

EXAMPLES

Cyan Pigment Dispersion

A cyan dispersion was prepared using a procedure disclosed in U.S. Patent Application Publication No. 2012/0214939, the disclosure of which is incorporated by reference herewith for all purposes as if fully set forth. A cyan TRB2 pigment was employed, and the dispersant was cross-linked after dispersing the pigment.

Yellow Pigment Dispersion

A yellow dispersion was prepared in a similar fashion as the Cyan Dispersion with the exception of using yellow pigment PY74.

Magenta Pigment Dispersion

A magenta dispersion was prepared in a similar fashion as the Cyan Dispersion with the exception of using magenta pigment PR122.

Black Pigment Dispersion

A black dispersion was prepared in a similar fashion as the Cyan Dispersion with the exception of using carbon black pigment.

Polymer Binder 1

To a dry, alkali- and acid-free flask, equipped with an addition funnel, a condenser, stirrer and a nitrogen gas line was added Desmophen® C1200 (280 g), MDEA (17 g), acetone (136 g) and 0.02 g DBTL. The contents were heated to 40° C. and mixed well. IPDI (115 g) was then added to the flask via the addition funnel with any residual IPDI being rinsed from the addition funnel into the flask with 10 g acetone.

The flask temperature was raised to 50° C., held for 60 minutes then followed by DMPA (20 g), then followed by TEA (12 g), addition to the flask via the addition funnel, which was then rinsed with acetone (10 g). The flask temperature was then raised again to 50° C. and held at 50° C. until NCO % was 1.25% or less.

With the temperature at 50° C., deionized water (695 g) was added over 10 minutes, followed by TETA solution (44 g as 10.5 wt % solution in water) over 5 minutes, via the addition funnel. The mixture was held at 50° C. for 1 hour then cooled to room temperature.

Acetone (156 g) was removed under vacuum, leaving a final dispersion of polyurethane with about 35.0% solids by weight. This polyurethane binder contains about 65% Desmophen C1200 as the soft segment part.

Polymer Binder 2

To a dry, alkali- and acid-free flask, equipped with an addition funnel, a condenser, stirrer and a nitrogen gas line was added 699.2 g Desmophene C 1200, a polyester carbonate diol (Bayer), 280.0 g acetone and 0.06 g DBTL. The contents were heated to 40° C. and mixed well. 189.14 g IPDI was then added to the flask via the addition funnel at 40° C. over a period of 60 min, with any residual IPDI being rinsed from the addition funnel into the flask with 15.5 g acetone.

The flask temperature was raised to 50° C., held for 30 minutes then followed by 44.57 g DMPA, then followed by 25.2 g TEA, was added to the flask via the addition funnel, which was then rinsed with 15.5 g acetone. The flask temperature was then raised again to 50° C. and held at 50° C. until NCO % was 1.23% or less.

With the temperature at 50° C., 1498.0 g deionized water was added over 10 minutes, followed by mixture of 97.5 g EDA (as a 6.25% solution in water) and 29.7 g TETA (as a 6.25% solution in water) over 5 minutes, via the addition funnel, which was then rinsed with 80.0 g water. The mixture was held at 50° C. for 1 hour, and then cooled to room temperature.

Acetone (310.0 g) was removed under vacuum, leaving a final dispersion of polyurethane with about 35.0% solids by weight. This polyurethane binder contains about 72% Desmophen C1200 as the soft segment part.

Polymer Binder 3

To a dry, alkali- and acid-free flask, equipped with an addition funnel, a condenser, stirrer and a nitrogen gas line was added Desmophen C1200 (600 g), MDEA (45 g), 1, 3 propanediol (22.5 g), acetone (381 g) and 0.08 g DBTL. The contents were heated to 40° C. and mixed well. IPDI (390 g) was then added to the flask via the addition funnel with any residual IPDI being rinsed from the addition funnel into the flask with 10 g acetone.

The flask temperature was raised to 50° C., held for 60 minutes then followed by DMPA (63 g), then followed by TEA (37.5 g), addition to the flask via the addition funnel, which was then rinsed with acetone (10 g). The flask temperature was then raised again to 50° C. and held at 50° C. until NCO % was 1.70% or less.

With the temperature at 50° C., deionized water (1917 g) was added over 10 minutes, followed by TETA solution (164 g as 10.5 wt % solution in water) over 5 minutes, via the addition funnel. The mixture was held at 50° C. for 1 hour then cooled to room temperature.

Acetone (410 g) was removed under vacuum, leaving a final dispersion of polyurethane with about 33.0% solids by weight. This polyurethane binder contains about 53% Desmophen C1200 as the soft segment part.

Polymer Binder 4

This ethylene/acrylic acid copolymer dispersion is Michem Prime™ 48525R (Michelman Inc., Cincinnati, Ohio). This contains about 20% by weight acrylic acid and has an acid number of about 160 mg KOH/g. It is a sodium neutralized aqueous dispersion with an average particle size of about 20 nm.

Polymer Binder 5

This binder was prepared by dispersing in water ethylene/methacrylic acid copolymer (DuPont Surlyn™ PC2000 from DuPont, Wilmington, Del.) containing about 20% by weight of methacrylic acid and about 45% neutralized by sodium hydroxide. The average dispersion particle size was about 25 nm.

Polymer Binder 6

To a dry, alkali- and acid-free flask, equipped with an addition funnel, a condenser, stirrer and a nitrogen gas line was added Eternacoll® UC-100 available from UBE Industries, Ltd, Tokyo, Japan (680 g), acetone (687 g) and 0.2 g DBTL. The contents were heated to 40° C. and mixed well. IPDI (366 g) was then added to the flask via the addition funnel with any residual IPDI being rinsed from the addition funnel into the flask with 10 g acetone.

The flask temperature was raised to 50° C., held for 60 minutes then followed by DMPA (86 g), then followed by TEA (57 g), addition to the flask via the addition funnel, which was then rinsed with acetone (10 g). The flask temperature was then raised again to 50° C. and held at 50° C. until NCO % was 1.55% or less.

With the temperature at 50° C., deionized water (2268 g) was added over 10 minutes, followed by EDA solution (29 g as 6.25 wt % solution in water) over 5 minutes, via the addition funnel. The mixture was held at 50° C. for 1 hour then cooled to room temperature.

Acetone (707 g) was removed under vacuum, leaving a final dispersion of polyurethane with about 33.0% solids by weight. This polyurethane binder contains about 57% Eternacoll® UC-100 as the soft segment part.

Preparation and Testing of Inks

Inks were prepared by combining ingredients as described in corresponding Table 1 through Table 6. After combination of the ingredients, inks were deposited on a coated media UPM Finesse Gloss (UPM, Helsinki, Finland) using a Gardo wet film applicator rod of wire size 3 (Paul N. Gardner Inc., Florida, USA).

The wet film was dried for 60 seconds in a 50° C. oven after which an unprinted white sheet of said coated paper was laid over the dried ink film. A weight was laid on top such that a pressure of 9 kg per square cm² was applied for 5 minutes. The weight was then lifted and the sheets are pulled apart. The amount of color transfer from the ink layer to the white paper was measured using an X-Rite Greytag Macbeth spectrophotometer.

Table 1 shows the impact of the amount of binder in the ink on the resistance of the ink film towards color transfer when subjected to pressure. When an ink contains no binder (EX.1), color transfer is not a problem. However, inks that do not contain binder have unacceptable level of durability towards mechanical stresses such as scratching and abrasion generally required for good quality printed products. Therefore, the addition of binders is highly desirable. The blocking resistance of the ink film, as measured by the amount of color transfer, deteriorates with even small amounts of binder. At very high levels of binder, such as in EX. 6 or higher, the blocking resistance is less negatively affected. However, inks containing such high levels of binders generally suffer from high viscosities, and other negative performance issues including poor drop formation and reliability of jetting and short latency time to name a few. It is therefore urgently needed for a solution to resolve the problem of blocking for inks that contain sufficient amounts of binders for durability, but not in such a high amount of binder that deterioration of other properties starts to occur.

TABLE 1

|  | EX. 1 | EX. 2 | EX. 3 | EX. 4 | EX. 5 | EX. 6 |
|---|---|---|---|---|---|---|
| Ingredients |  |  |  |  |  |  |
| Cyan Pigment (from Cyan Dispersion) | 2.5% | 2.5% | 2.5% | 2.5% | 2.5% | 2.5% |
| Polymer Binder 1 | 0.0% | 2.0% | 4.0% | 6.0% | 8.0% | 10.0% |
| Surfynol 104 (Air Products, Allentown, PA) | 0.5% | 0.5% | 0.5% | 0.5% | 0.5% | 0.5% |
| Ethylene Glycol | 10.0% | 10.0% | 10.0% | 10.0% | 10.0% | 10.0% |
| 1,2-hexanediol | 3.0% | 3.0% | 3.0% | 3.0% | 3.0% | 3.0% |
| Triethylene glycol butyl ether | 10.0% | 10.0% | 10.0% | 10.0% | 10.0% | 10.0% |
| Glycerol | 1.9% | 1.9% | 1.9% | 1.9% | 1.9% | 1.9% |
| Deionized Water | Balance to 100% | | | | | |
| Properties |  |  |  |  |  |  |
| OD of Ink Film | 1.79 | 1.83 | 2.17 | 2.42 | 2.30 | 2.30 |
| milli-OD of color transfer | 0 | 50 | 93 | 130 | 70 | 53 |

Table 2 lists solvents, solvent group and boiling points for all solvents used in Tables 3-7.

TABLE 2

| Solvent | Solvent Group | Boiling Point, ° C. | Solubility of Water in Solvent |
|---|---|---|---|
| Table 3 | | | |
| 2-Methyl-2,4-pentanediol | A | 197 | 100.00% |
| Ethylene Glycol | A | 197 | 100.00% |
| 1,2-Propanediol | A | 187 | 100.00% |
| Propylene glycol di-methyl ether | B | 175 | 4.50% |
| 1,2-hexanediol | C | 223 | 100.00% |
| Glycerol | C | 290 | 100.00% |
| Table 4 | | | |
| 1,2-Propanediol | A | 187 | 100.00% |
| Propylene glycol methyl ether | B | 120 | 100.00% |
| Propylene glycol methyl ether acetate | B | 146 | 3.00% |
| Propylene glycol n-propyl ether | B | 149 | 100.00% |
| Propylene glycol n-butyl ether | B | 171 | 15.50% |
| Propylene glycol di-methyl ether | B | 175 | 4.50% |
| Dipropylene glycol methyl ether | B | 190 | 100.00% |
| Dipropylene glycol methyl ether acetate | B | 209 | 3.50% |
| 1,2-hexanediol | C | 223 | 100.00% |
| Glycerol | C | 290 | 100.00% |

TABLE 2-continued

| Solvent | Solvent Group | Boiling Point, °C. | Solubility of Water in Solvent |
|---|---|---|---|
| Table 5 | | | |
| 1,2-Propanediol | A | 187 | 100.00% |
| Dipropylene glycol n-propyl ether | B | 213 | 20.30% |
| Dipropylene glycol n-butyl ether | B | 230 | 12.00% |
| Tripropylene glycol n-propyl ether | B | 261 | 14.40% |
| Tripropylene glycol n-butyl ether | B | 274 | 8.00% |
| 1,2-hexanediol | C | 223 | 100.00% |
| Glycerol | C | 290 | 100.00% |
| Table 6 | | | |
| 1,2-Propanediol | A | 187 | 100.00% |
| Propylene glycol di-methyl ether | B | 175 | 4.50% |
| 1,3-butanediol | C | 204 | 100.00% |
| 1,6-hexanediol | C | 208 | 100.00% |
| 1,3-propanediol | C | 211 | 100.00% |
| 1,2-hexanediol | C | 223 | 100.00% |
| 1,4-butanediol | C | 228 | 100.00% |
| Dipropylene glycol | C | 231 | 100.00% |
| 1,5-pentanediol | C | 242 | 100.00% |
| Tripropylene glycol methyl ether | C | 243 | 100.00% |
| Glycerol | C | 290 | 100.00% |
| Table 7 | | | |
| 1,2-Propanediol | A | 187 | 100.00% |
| Propylene glycol di-methyl ether | B | 175 | 4.50% |
| 1,3-butanediol | C | 204 | 100.00% |
| 1,6-hexanediol | C | 208 | 100.00% |
| 1,3-propanediol | C | 211 | 100.00% |
| 1,2-hexanediol | C | 223 | 100.00% |
| 1,4-butanediol | C | 228 | 100.00% |
| Diethylene glycol | C | 245 | 100.00% |
| 2-Pyrrolidone | C | 245 | 100.00% |
| Triethylene glycol butyl ether | C | 280 | 100.00% |
| Triethylene glycol | C | 288 | 100.00% |
| Glycerol | C | 290 | 100.00% |
| Hydroxyethyl-2-pyrrolidone | C | 296 | 100.00% |
| Tetraethylene glycol | C | 330 | 100.00% |

Examples 7 through 25 in Tables 3, 4 and 5 demonstrate the solvents from Group A and B compositions that provide very good resistance to color transfer. The amount of color transfer was very little.

TABLE 3

| | | EX. 7 | EX. 8 | EX. 9 | EX. 10 | EX. 11 | EX. 12 |
|---|---|---|---|---|---|---|---|
| Cyan pigment from Cyan Dispersion | | 2.50% | 2.50% | 2.50% | 2.50% | 2.50% | 2.50% |
| Polymer Binder 1 | | 5.00% | 5.00% | 5.00% | 5.00% | 5.00% | 5.00% |
| Surfynol 104 | | 1.90% | 1.90% | 1.90% | 1.90% | 1.90% | 1.90% |
| | Solvent Group | | | | | | |
| 2-Methyl-2,4-pentanediol | A | 17.00% | | | 9.00% | | |
| Ethylene Glycol | A | | 17.00% | | | | |
| 1,2-Propanediol | A | 1.90% | 1.90% | 20.90% | 20.90% | 20.90% | 20.90% |
| Propylene glycol di-methyl ether | B | 9.00% | 9.00% | 9.00% | | | 9.00% |
| 1,2-hexanediol | C | 1.50% | 1.50% | 1.50% | 1.50% | 1.50% | 1.50% |
| Glycerol | C | 1.90% | 1.90% | 1.90% | 1.90% | 1.90% | 1.90% |
| Deionized Water | | Balance to 100% | | | | | |
| Properties | | | | | | | |
| OD of Ink Film | | 1.45 | 1.9 | 2.23 | 2.19 | 2.22 | 1.91 |
| milli-OD of color transfer | | 10 | 10 | 30 | 27 | 33 | 27 |
| Weight Ratio of Group A to Group B | | 2.1:1 | 2.1:1 | 2.3:1 | — | — | 2.3:1 |
| Weight Ratio of Group A, B to Group C | | 8.2:1 | 8.2:1 | 8.7:1 | 8.7:1 | 6.1:1 | 8.7:1 |
| (Group A, B)/(Total sum of Group A, B, C) | | 89% | 89% | 90% | 90% | 86% | 90% |

TABLE 4

| | | EX. 13 | EX. 14 | EX. 15 | EX. 16 | EX. 17 | EX. 18 | EX. 19 |
|---|---|---|---|---|---|---|---|---|
| Cyan Pigment from Cyan Dispersion | | 2.50% | 2.50% | 2.50% | 2.50% | 2.50% | 2.50% | 2.50% |
| Polymer Binder 1 | | 5.00% | 5.00% | 5.00% | 5.00% | 5.00% | 5.00% | 5.00% |
| Surfynol 104 | | 1.90% | 1.90% | 1.90% | 1.90% | 1.90% | 1.90% | 1.90% |
| | Solvent Group | | | | | | | |
| 1,2-Propanediol | A | 20.90% | 20.90% | 26.90% | 20.90% | 18.90% | 20.90% | 20.90% |
| Propylene glycol methyl ether | B | | | | | | | |

TABLE 4-continued

| | | | | | | | | |
|---|---|---|---|---|---|---|---|---|
| Propylene glycol methyl ether acetate | B | 9.00% | | | | | | |
| Propylene glycol n-propyl ether | B | | 9.00% | | | | | |
| Propylene glycol n-butyl ether | B | | | 5.50% | 9.00% | | | |
| Propylene glycol di-methyl ether | B | | | | | 9.00% | | |
| Dipropylene glycol methyl ether | B | | | | | | 9.00% | |
| Dipropylene glycol methyl ether acetate | B | | | | | | | 9.00% |
| 1,2-hexanediol | C | 1.50% | 1.50% | 1.50% | 1.50% | 1.50% | 1.50% | 1.50% |
| Glycerol | C | 1.90% | 1.90% | 1.90% | 1.90% | 1.90% | 1.90% | 1.90% |
| Deionized Water | | | | Balance to 100% | | | | |
| Properties | | | | | | | | |
| OD of Ink Film | | 1.79 | 2.17 | 1.97 | 1.94 | 2.13 | 2.14 | 1.93 |
| milli-OD of color transfer | | 10 | 40 | 20 | 10 | 20 | 40 | 17 |
| Weight Ratio of Group A to Group B | | 2.3:1 | 2.3:1 | 4.9:1 | 2.3:1 | 2.1:1 | 2.3:1 | 2.3:1 |
| Weight Ratio of Group A, B to Group C | | 8.7:1 | 8.7:1 | 9.5:1 | 8.7:1 | 8.2:1 | 8.7:1 | 8.7:1 |
| (Group A, B)/(Total sum of Group A, B, C) | | 90% | 90% | 90% | 90% | 89% | 90% | 90% |

TABLE 5

| | | EX. 20 | EX. 21 | EX. 22 | EX. 23 | EX. 24 | EX. 25 |
|---|---|---|---|---|---|---|---|
| Cyan Pigment from Cyan Dispersion | | 2.50% | 2.50% | 2.50% | 2.50% | 2.50% | 2.50% |
| Polymer Binder 1 | | 5.00% | 5.00% | 5.00% | 5.00% | 5.00% | 5.00% |
| Surfynol 104 | | 1.90% | 1.90% | 1.90% | 1.90% | 1.90% | 1.90% |
| | Solvent Group | | | | | | |
| 1,2-Propanediol | A | 20.90% | 26.90% | 20.90% | 20.90% | 26.90% | 20.90% |
| Dipropylene glycol n-propyl ether | B | 9.00% | | | | | |
| Dipropylene glycol n-butyl ether | B | | 4.50% | 9.00% | | | |
| Tripropylene glycol n-propyl ether | B | | | | 9.00% | | |
| Tripropylene glycol n-butyl ether | B | | | | | 4.50% | 9.00% |
| 1,2-hexanediol | C | 1.50% | 1.50% | 1.50% | 1.50% | 1.50% | 1.50% |
| Glycerol | C | 1.90% | 1.90% | 1.90% | 1.90% | 1.90% | 1.90% |
| Deionized Water | | | | Balance to 100% | | | |
| Properties | | | | | | | |
| OD of Ink Film | | 2.18 | 1.97 | 1.93 | 2.1 | 1.96 | 2.03 |
| milli-OD of color transfer | | 40 | 30 | 10 | 20 | 40 | 7 |
| Weight Ratio of Group A to Group B | | 2.3:1 | 6.0:1 | 2.3:1 | 2.3:1 | 6.0:1 | 2.3:1 |
| Weight Ratio of Group A, B to Group C | | 8.7:1 | 9.2:1 | 8.7:1 | 8.7:1 | 9.2:1 | 8.7:1 |
| (Group A, B)/(Total sum of Group A, B, C) | | 90% | 90% | 90% | 90% | 90% | 90% |

In contrast, comparative examples CE1 through CE16 in Table 6 and Table 7 show inks that contain a predominance of solvents from Group C, containing insufficient amounts of solvents of Group A or B type, are weak in blocking, showing significant transfer of color from the ink film to the white unprinted paper. Where there are significant color transfer onto the unprinted sheet, the colored ink film are also invariably damage in areas where the color had been lifted off resulting in whites of the underlying paper showing through.

TABLE 6

| | CE1 | CE2 | CE3 | CE4 | CE5 | CE6 | CE7 | CE8 |
|---|---|---|---|---|---|---|---|---|
| Cyan Pigment from Cyan Dispersion | 2.50% | 2.50% | 2.50% | 2.50% | 2.50% | 2.50% | 2.50% | 2.50% |
| Polymer Binder 1 | 5.00% | 5.00% | 5.00% | 5.00% | 5.00% | 5.00% | 5.00% | 5.00% |

TABLE 6-continued

| | | | | | | | | | |
|---|---|---|---|---|---|---|---|---|---|
| Surfynol 104 (Air Products, Allentown, PA) | | 1.90% | 1.90% | 1.90% | 1.90% | 1.90% | 1.90% | 1.90% | 1.90% |
| | Solvent Group | | | | | | | | |
| 1,2-Propanediol | A | 1.90% | 1.90% | 1.90% | 1.90% | 1.90% | 1.90% | 1.90% | 20.90% |
| Propylene glycol di-methyl ether | B | 9.00% | 9.00% | 9.00% | 9.00% | 9.00% | 9.00% | 9.00% | |
| 1,3-butanediol | C | 17.00% | | | | | | | |
| 1,6-hexanediol | C | | 17.00% | | | | | | |
| 1,3-propanediol | C | | | 17.00% | | | | | |
| 1,2-hexanediol | C | 1.50% | 1.50% | 1.50% | 18.50% | 1.50% | 1.50% | 1.50% | 1.50% |
| 1,4-butanediol | C | | | | | 17.00% | | | |
| Dipropylene glycol | C | | | | | | 17.00% | | |
| 1,5-pentanediol | C | | | | | | | 17.00% | |
| Tripropylene glycol methyl ether | C | | | | | | | | 9.00% |
| Glycerol | C | 1.90% | 1.90% | 1.90% | 1.90% | 1.90% | 1.90% | 1.90% | 1.90% |
| Deionized Water | | | | | Balance to 100% | | | | |
| Properties | | | | | | | | | |
| OD of Ink Film | | 2.24 | 2.17 | 2.1 | 1.64 | 2.17 | 2.19 | 2.16 | 2.28 |
| milli-OD of color transfer | | 103 | 90 | 80 | 93 | 83 | 127 | 93 | 117 |
| Weight Ratio of Group A to Group B | | 0.2:1 | 0.2:1 | 0.2:1 | 0.2:1 | 0.2:1 | 0.2:1 | 0.2:1 | — |
| Weight Ratio of Group A, B to Group C | | 0.5:1 | 0.5:1 | 0.5:1 | 0.5:1 | 0.5:1 | 0.5:1 | 0.5:1 | 1.7:1 |
| (Group A, B)/(Total sum of Group A, B, C) | | 35% | 35% | 35% | 35% | 35% | 35% | 35% | 63% |

TABLE 7

| | | CE9 | CE10 | CE11 | CE12 | CE13 | CE14 | CE15 | CE16 |
|---|---|---|---|---|---|---|---|---|---|
| Cyan Pigment from Cyan Dispersion | | 2.50% | 2.50% | 2.50% | 2.50% | 5.00% | 2.50% | 2.50% | 2.50% |
| Polymer Binder 1 | | 5.00% | 5.00% | 5.00% | 5.00% | 5.00% | 5.00% | 5.00% | 5.00% |
| Surfynol 104 (Air Products, Allentown, PA) | | 1.90% | 1.90% | 1.90% | 1.90% | 1.90% | 1.90% | 1.90% | 1.90% |
| | Solvent Group | | | | | | | | |
| 1,2-Propanediol | A | 1.90% | 1.90% | 20.90% | 1.90% | 1.90% | 1.90% | 26.90% | 1.90% |
| Propylene glycol di-methyl ether | B | 9.00% | 9.00% | | 9.00% | | 9.00% | | 9.00% |
| 1,3-butanediol | C | | | | | | | | |
| 1,6-hexanediol | C | | | | | | | | |
| 1,3-propanediol | C | | | | | | | | |
| 1,2-hexanediol | C | 1.50% | 1.50% | 1.50% | 1.50% | | 1.50% | 1.50% | 1.50% |
| 1,4-butanediol | C | | | | | | | | |
| Diethylene glycol | C | 19.00% | | | | | | | |
| 2-Pyrrolidone | C | | 17.00% | | | | | | |
| Triethylene glycol butyl ether | C | | | 9.00% | | | | | |
| Triethylene glycol | C | | | | 19.00% | | | | |
| Glycerol | C | 1.90% | 1.90% | 1.90% | 1.90% | 29.00% | 18.90% | 1.90% | 1.90% |
| Hydroxyethyl-2-pyrrolidone | C | | | | | | | 5.00% | |
| Tetraethylene glycol | C | | | | | | | | 19.00% |
| Deionized Water | | | | | Balance to 100% | | | | |
| Properties | | | | | | | | | |
| OD of Ink Film | | 1.92 | 1.76 | 1.55 | 1.18 | 2.33 | 1.81 | 1.9 | 1.97 |
| milli-OD of color transfer | | 157 | 60 | 150 | 100 | 113 | 80 | 80 | 117 |
| Weight Ratio of Group A to Group B | | 0.2:1 | 0.2:1 | — | 0.2:1 | — | 0.2:1 | — | 0.2:1 |
| Weight Ratio of Group A, B to Group C | | 0.5:1 | 0.5:1 | 1.7:1 | 0.5:1 | 0.1:1 | 0.5:1 | 3.2:1 | 0.5:1 |
| (Group A, B)/(Total sum of Group A, B, C) | | 33% | 35% | 63% | 33% | 6% | 35% | 76% | 33% |

Examples in Table 8 illustrate the effectiveness of several nonionic surfactants when used in conjunction with the solvents discovered in this study.

TABLE 8

|  | EX. 7 | EX. 26 | EX. 27 | EX. 8 | EX. 28 | EX. 29 | EX. 30 | CE17 | EX. 31 |
|---|---|---|---|---|---|---|---|---|---|
| Cyan Pigment in Cyan Dispersion | 2.5% | 2.5% | 2.5% | 2.5% | 2.5% | 2.5% | 2.5% | 5.0% | 5.0% |
| Polymer Binder 1 | 5.0% | 5.0% | 5.0% | 5.0% | 5.0% | 5.0% | 5.0% | 5.0% | 5.0% |
| Surfynol 104 | 1.9% | — | — | 1.9% | — | — | — | 1.9% | — |
| Capstone Nonionic Surfactant (DuPont, Wilmington, DE) | — | 0.35% | — | — | 0.35% | — | — | — | 0.35% |
| Dow Silicone Super-wetter Additive (Dow Chemicals, Midland, MI) | — | — | 0.35% | — | — | 0.35% | 1.90% | — | — |
| 2-Methyl-2,4-pentanediol | 17.0% | 17.0% | 17.0% | — | — | — | — | — | — |
| Ethylene Glycol | — | — | — | 17.0% | 17.0% | 17.0% | 17.0% | — | — |
| 1,2-Propanediol | 1.9% | — | — | 1.9% | — | — | — | 1.9% | — |
| Propylene glycol di-methyl ether | 9.0% | 9.0% | 9.0% | 9.0% | 9.0% | 9.0% | 9.0% | 9.0% | 9.0% |
| 1,2-hexanediol | 1.5% | 1.5% | 1.5% | 1.5% | 1.5% | 1.5% | 1.5% | | |
| Glycerol | 1.9% | 1.9% | 1.9% | 1.9% | 1.9% | 1.9% | 1.9% | 20.0% | 20.0% |
| Deionized Water | | | | Balance to 100% | | | | | |
| Properties | | | | | | | | | |
| OD of Ink Film | 1.45 | 1.97 | 2.09 | 1.90 | 2.18 | 2.11 | 2.20 | 2.35 | 2.44 |
| milli-OD of color transfer | 10 | 3 | 7 | 10 | 3 | 0 | 0 | 73 | 20 |
| Surface tension, initial | 29.71 | 25.79 | 27.69 | 29.42 | 23.75 | 25.21 | 23.04 | — | — |
| Surface tension after 7 days at 70° C. | 29.70 | 25.44 | 29.29 | 29.32 | 23.47 | 26.77 | 23.16 | — | — |
| % Change after 7 days at 70° C. | 0% | −1% | 6% | 0% | −1% | 6% | 1% | — | — |

Examples in Table 9 and Table 10 illustrate the preferred polymer binder to be used in this invention. The polymer binders can be either polyurethane alone or more preferably a combination of dispersed polyurethane and dispersed olefin ionic copolymers.

TABLE 9

|  | EX. 9 | EX. 14 | EX. 18 | EX. 20 | CE8 | CE18 | CE19 | CE20 | CE21 | CE22 |
|---|---|---|---|---|---|---|---|---|---|---|
| Cyan Pigment from Cyan Dispersion | 2.5% | 2.5% | 2.5% | 2.5% | 2.5% | 2.5% | 2.5% | 2.5% | 2.5% | 2.5% |
| Polymer Binder 1 | 5.0% | 5.0% | 5.0% | 5.0% | 5.0% | — | — | — | — | — |
| Polymer Binder 2 | — | — | — | — | — | 5.0% | 5.0% | 5.0% | 5.0% | 5.0% |
| Surfynol 104 | 1.9% | 1.9% | 1.9% | 1.9% | 1.9% | 1.9% | 1.9% | 1.9% | 1.9% | 1.9% |
| 1,2-Propanediol | 20.9% | 20.9% | 20.9% | 20.9% | 20.9% | 20.9% | 20.9% | 20.9% | 20.9% | 20.9% |
| Propylene glycol n-propyl ether | | 9.0% | | | | | | 9.0% | | |
| Propylene glycol di-methyl ether | 9.0% | | | | | | 9.0% | | | |
| Dipropylene glycol methyl ether | | | 9.0% | | | | | | 9.0% | |
| Dipropylene glycol n-propyl ether | | | | 9.0% | | | | | | |
| Tripropylene glycol methyl ether | | | | | 9.0% | | | | | 9.0% |
| 1,2-hexanediol | 1.5% | 1.5% | 1.5% | 1.5% | 1.5% | 1.5% | 1.5% | 1.5% | 1.5% | 1.5% |
| Glycerol | 1.9% | 1.9% | 1.9% | 1.9% | 1.9% | 1.9% | 1.9% | 1.9% | 1.9% | 1.9% |
| Deionized Water | | | | | Balance to 100% | | | | | |
| Properties | | | | | | | | | | |
| milli-OD of color transfer | 30 | 40 | 40 | 40 | 117 | 137 | 140 | 140 | 173 | 216 |

TABLE 10

|  | EX. 32 | EX. 33 | EX. 34 | EX. 35 | EX. 36 | EX. 37 | EX. 38 |
| --- | --- | --- | --- | --- | --- | --- | --- |
| Cyan Pigment | 2.2% | 2.2% | 2.2% | 2.2% | 2.2% | 2.2% | 2.2% |
| Polymer Binder 1 | 5.0% |  |  | 2.5% | 3.0% | 3.0% | 3.0% |
| Polymer Binder 3 |  | 5.0% |  |  |  |  |  |
| Polymer Binder 4 |  |  | 5.0% | 2.5% |  | 1.0% |  |
| Polymer Binder 5 |  |  |  |  |  |  | 1.0% |
| Capstone Nonionic Surfactant | 0.4% | 0.4% | 0.4% | 0.4% | 0.4% | 0.4% | 0.4% |
| 1,2 Propanediol | 22.0% | 24.0% | 19.0% | 19.0% | 19.0% | 19.0% | 19.0% |
| Propylene glycol di-methyl ether | 5.0% | 5.0% |  |  | 6.0% | 4.0% | 4.0% |
| Dipropylene glycol n-propyl ether | 8.0% | 8.0% | 9.0% | 9.0% | 9.0% | 9.0% | 9.0% |
| 2-Methyl-2,4-pentanediol |  |  |  |  | 3.0% | 3.0% | 3.0% |
| Deionized Water | Balance to 100% | | | | | | |
| Properties | | | | | | | |
| milli-OD of color transfer | 3 | 7 | 0 | 0 | 3 | 0 | 0 |

Examples in Table 11 illustrate the preferred polyurethane binders to be used in this invention. The polyurethane binders can be either used alone or in any combinations with any other polymers including polyurethane, acrylic, styrene-containing binders.

TABLE 11

|  | EX. 39 | EX. 40 | EX. 40 |
| --- | --- | --- | --- |
| Cyan Pigment | 2.2% | 2.2% | 2.2% |
| Polymer Binder 6 | 5.5% | 5.5% | 5.5% |
| Capstone Nonionic Surfactant | 0.4% | 0.4% | 0.4% |
| 1,2 Propanediol | 22.5% |  | 7% |
| 1,3 Propanediol |  | 24.5% | 21% |
| Propylene glycol di-methyl ether | 4.0% | 4.0% |  |
| Dipropylene glycol n-propyl ether | 9.0% | 9.0% | 9% |
| Deionized Water | Balance to 100% | | |

What is claimed is:

1. An aqueous inkjet ink for printing on coated media, said ink comprising a dispersed pigment, an aqueous vehicle, a dispersed polymeric binder, and one or more nonionic surfactants, wherein said aqueous vehicle comprises one or more members of Group A solvents and one or more members of Group B solvents, wherein said Group A solvents contain two or more hydroxyl moieties per solvent molecule, and said Group B solvents contain one or no hydroxyl moiety per solvent molecule, and wherein said Group A solvents are selected from the group consisting of methyl pentane diol, and propane diol; and said Group B solvents are selected from the group consisting of propylene glycol di-methyl ether, propylene glycol n-propyl ether, dipropylene glycol methyl ether, dipropylene glycol n-propyl ether, dipropylene glycol n-butyl ether, tripropylene glycol n-propyl ether, tripropylene glycol n-butyl ether, propylene glycol methyl ether acetate, and dipropylene glycol methyl ether acetate.

2. The ink of claim 1, wherein the ratio of said Group A solvents to said Group B solvents is in the range of 10:1 to 0.75:1.

3. The ink of claim 2, wherein the ratio of said Group A solvents to said Group B solvents is in the range of 5:1 to 1:1.

4. The ink of claim 3, wherein the ratio of said Group A solvents to said Group B solvents is in the range of 4:1 to 1.2:1.

5. The ink of claim 1, wherein the total of Group A solvents and Group B solvents is at least about 75% by weight of the sum of all solvents in said ink.

6. The ink of claim 5, wherein the total of Group A solvents and Group B solvents is at least about 85% by weight of the sum of all solvents in said ink.

7. The ink of claim 6, wherein the total of Group A solvents and Group B solvents is at least about 95% by weight of the sum of all solvents in said ink.

8. The ink of claim 1, wherein the total of all solvents other than water is less than about 45% by weight based on the total weight of said ink.

9. The ink of claim 8, wherein the total of all solvents other than water is less than about 35% by weight based on the total weight of said ink.

10. The ink of claim 9, wherein the total of all solvents other than water is less than about 30% by weight based on the total weight of said ink.

11. The ink of claim 9, wherein said Group B solvents are selected from the group consisting of dipropylene glycol methyl ether, dipropylene glycol n-propyl ether, dipropylene glycol n-butyl ether, tripropylene glycol n-butyl ether, and dipropylene glycol methyl ether acetate.

12. The ink of claim 1, wherein said one or more non-ionic surfactants include a non-ionic fluoro surfactant.

13. The ink of claim 1, wherein said polymeric binder is a dispersed polyurethane or a mixture of a dispersed polyurethane and a dispersed olefin ionic copolymer.

14. The ink of claim 13, wherein said polyurethane has a hard segment and a soft segment, and the percentage of soft segment is less than 72%.

15. The ink of claim 14, wherein the percentage of soft segment is in the range of 50% to 70%.

* * * * *